2,960,439
UREA-DEXTROSE COMPOSITION AND METHOD FOR REDUCING INTRACRANIAL PRESSURE

Paul Settlage and Manucher Javid, Madison, Wis.; Elizabeth Settlage, executrix of said Paul Settlage, deceased, assignors to Wisconsin Alumni Research Foundation, Madison, Wis., a corporation of Wisconsin No Drawing. Filed Mar. 18, 1957, Ser. No. 646,533

4 Claims. (Cl. 167—65)

The present invention relates to a composition and method for lowering intracranial pressures.

Many agents including sodium chloride, sodium sulfate, sodium arabinate, sorbitol, sucrose, and dextrose have been used or proposed for use in hypertonic solution for reducing intracranial pressure since the original work of Weed and McKibben, Am. J. Physiol. 48, 512–530 (1919). All of these agents are effective in reducing intracranial tension, but each has some undesirable action that limits or prohibits its use. Sodium chloride, for example, has a pronounced hypotensive effect, but the initial pressure reduction is followed by a secondary rise to pressure levels that exceed the original. The secondary rise may aggravate the patient's condition and has been held accountable as a cause of death. See Bullock et al., Am. J. Physiol. 112, 82–96 (1935). Hypertonic sodium chloride, is therefore, no longer used. A degree of secondary rise in pressure has been demonstrated to occur after the administration of 50% dextrose, an agent that is frequently used today. Fifty percent sucrose, although it produces little or no secondary rise, injures the renal tubules. See Anderson et al., J.A.M.A. 114, 1983–1987 (1940). Evidence has been adduced that the tubular damage caused by sucrose is reversible and does not necessarily result in impairment of kidney function, but the investigators reporting this finding caution against its indiscriminate use. See Linderg et al., Arch. Int. Med. 63, 907–918 (1939). See also the warning against repeated injections of sucrose or dextrose more frequently than at intervals of several weeks by the Eli Lilly & Company, De Re Medica, p. 353 (1951).

About thirty years ago, marked cerebrospinal fluid pressure reductions were observed by Fremont-Smith and Forbes in three cats after intraperitoneal injection of 50% urea, Arch. Neurol. & Psychiat. 18, 550–564 (1927). This was also observed by Wolff and Forbes who administered urea intravenously to one cat, Arch. Neurol. & Psychiat. 20, 73–83 (1928). Over twenty years later, the effect of intravenous urea on cerebrospinal fluid pressure in monkeys was reported by Smythe, Smythe and Settlage, J. Neuropath. & Exper. Neurol. 9, 438–442 (1950). While these observations and particularly the latter report on work with monkeys, suggested that urea might possibly be of some use clinically, apparently no one, as far as known, carried out a clinical evaluation of urea prior to the report on our preliminary investigations in J.A.M.A. 160, 943–949 (1956).

In our work with animals, it was observed that aqueous solutions of urea, of varying concentrations, produced transient though quite marked hemoglobinuria. See also, the reference to bloody urine in the Smythe et al. article, supra. It is possible, if other investigators worked with urea, that they also ran into hemoglobinuria and, for this or other reasons, discarded urea as a clinical agent for use in lowering intracranial pressure.

In our investigations we discovered that when urea was dissolved in dilute dextrose solutions, e.g. about 5% w./v. dextrose solution, hemoglobinuria normally resulting from the administration of up to about 30% w./v. urea solutions did not take place. We also discovered that solutions of this type containing relatively small amounts of dextrose did not result in any secondary rise in pressure or any renal damage and also that the presence of the dextrose did not interfere with the desired action of the urea in lowering intracranial pressure.

The concentration of urea can run from about 5% up to about 30% (w./v.) with a range of about 10–30% w./v. urea being generally preferred. Solutions with concentrations of urea much below 5% produce little reduction in pressure while solutions with concentrations of urea much above 30% tend to produce unwanted side reactions including hemoglobinuria. The concentrations of dextrose solutions used to dissolve the urea can run from about 4% up to about 6% or more, e.g. 10% w./v., with about 5% (w./v.) dextrose solutions being preferred. The use of solutions with concentrations of dextrose much below 4% may result in some hemoglobinuria while the use of solutions containing more than 5% dextrose produce no noticeable additional beneficial effect. Concentrated solutions containing appreciably more than 10% dextrose should be avoided due to possible secondary rise in pressure with or without renal complications. The following example will serve to illustrate the invention.

Example 30 grams of urea crystals crystallized from acetone and sterilized by washing in ether are dissolved in 78 cc. of a cool (room temperature) sterile aqueous solution of 5% dextrose made by dissolving 5 grams of dextrose in sufficient water to yield 100 cc. This provides a 100 cc. of 30% (w./v.) urea solution containing 30 grams of urea and about 4 (3.9) grams of dextrose. In a similar manner, solutions containing less urea, e.g. 20% urea, and varying amounts of dextrose can be readily prepared. The solutions can also be prepared by dissolving dry sterile mixtures of urea and dextrose in sterile water, the ratio of urea and dextrose being such, when dissolved in water, as to provide 5–30% w./v. urea solutions in about 4–10% w./v. dextrose solutions, e.g. 100 cc. solution containing 5–30 grams of urea dissolved in an aqueous 4–10% w./v. dextrose solution. For example, 34 grams of a composition containing about 88% by weight of urea and about 12% by weight of dextrose can be dissolved in sufficient water to form 100 cc. solution containing about 30 grams of urea and about 4 grams of dextrose. This solution is similar to the solution prepared by dissolving 30 grams of urea in 5% dextrose in accordance with the above example. The use of sterile urea crystals and sterile dextrose and sterile water is necessary as aqueous urea solutions decompose when sterilized by boiling or autoclaving.

The urea-dextrose solutions of the present invention are administered by intravenous injection. Reduction in intracranial pressure has been obtained by the injection of small amounts of urea, e.g. 100 mg./kg., as well as relatively large amounts, e.g. 1500 mg./kg., which were also found to be well tolerated. For most clinical purposes the recommended dose runs from about 500 mg./kg. up to 1500 mg./kg., i.e. 0.5–1.5 grams of urea per kg. (body weight) of the patient. In addition to lowering intracranial pressure, the compositions of the present invention can also be employed to lower intraocular pressure.

We claim:

1. A composition consisting essentially of sterile urea and dextrose, the ratio of said ingredients when dissolved in water being such as to provide about a 5–10% w./v. solution of dextrose having dissolved therein about 5–30% w./v. of urea, said aqueous solution being adaptable for use in lowering intracranial pressure.

2. A composition adaptable for use in lowering intracranial pressure consisting essentially of a 5–10% w./v. aqueous solution of dextrose having dissolved therein 5–30% w./v. of sterile urea.

3. A composition adaptable for use in lowering intracranial pressure consisting essentially of about a 5% w./v. aqueous solution of dextrose having dissolved therein about 30% w./v. of sterile urea.

4. The method of reducing intracranial pressure by intravenous administration of a sterile aqueous solution of urea and dextrose and avoiding hemoglobinuria normally resulting from the intravenous administration of aqueous solutions of urea and a secondary rise in pressure associated with the intravenous administration of aqueous solutions of dextrose, which consists essentially in sterilizing urea, dissolving the sterile urea in a sterile aqueous 5–10% w./v. dextrose solution to provide a sterile urea-dextrose solution containing about 5–30% w./v. of urea, and then reducing the intracranial pressure by the intravenous administration of the resulting solution in an amount sufficient to provide about 100 mg. to 1500 mg. of urea per kg. of body weight of patient.

References Cited in the file of this patent

Javid et al.: J.A.M.A., vol. 160, No. 11, Mar. 17, 1956, pp. 943–949, pp. 943 and 944 esp. pert.

Smythe et al.: J. Neuropath. and Exp. Neurol., 9: 438–442, October 1950, thru Javid et al., J.A.M.A., vol. 160, No. 11, March 1956, p. 943, last par. beginning bottom left hand col. and continuing top right hand column.

Kleiner: "Human Biochem.," 2nd ed., C. V. Mosby Co., St. Louis, 1948, pp. 57, 58 and 160.